Feb. 5, 1924.
P. G. NEILL
1,482,694
WHEEL PULLER
Filed Sept. 23, 1922
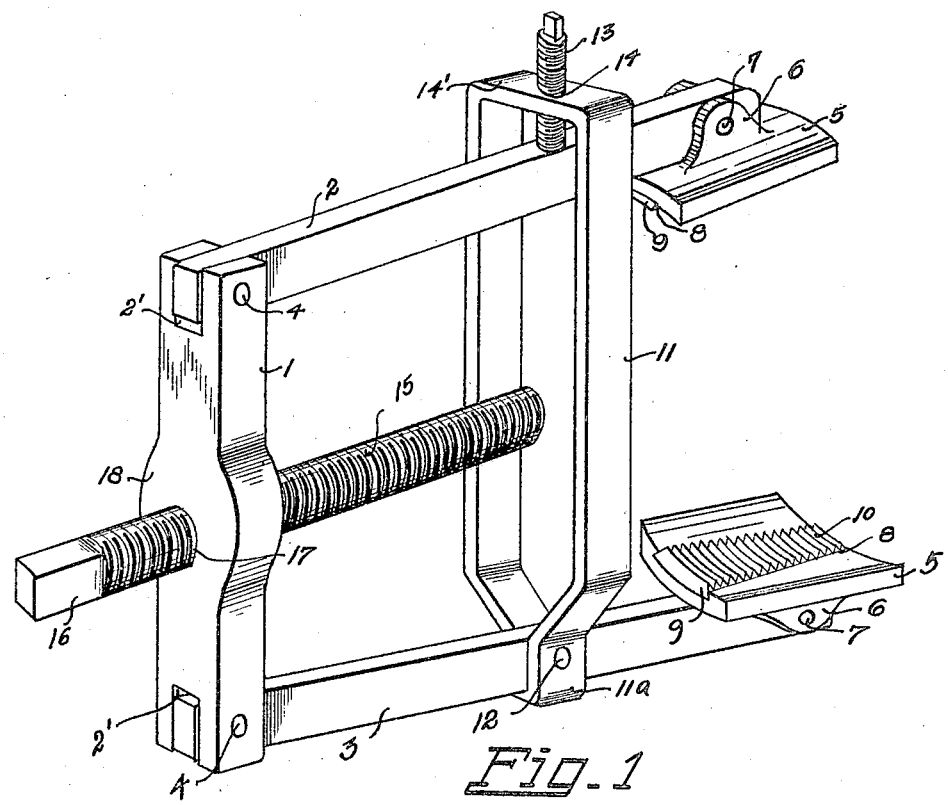
Fig. 1
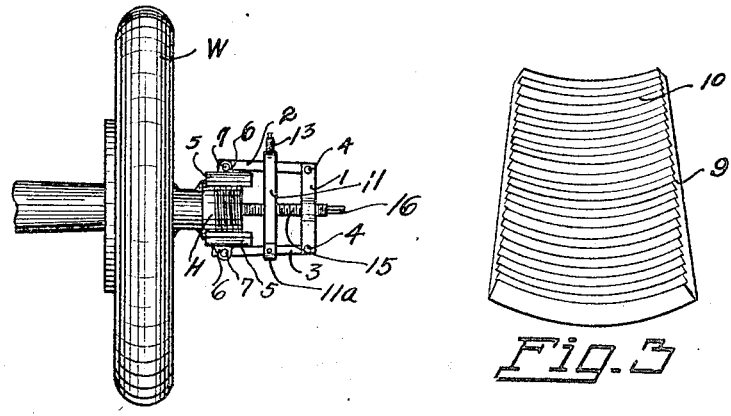
Fig. 2
Fig. 3
Inventor
Percy G. Neill
By Herbert E. Smith
Attorney Patented Feb. 5, 1924.

1,482,694

UNITED STATES PATENT OFFICE.

PERCY G. NEILL, OF BONNERS FERRY, IDAHO.

WHEEL PULLER.

Application filed September 23, 1922. Serial No. 590,033.

*To all whom it may concern:*

Be it known that I, PERCY G. NEILL, a citizen of the United States, residing at Bonners Ferry, in the county of Bonner and State of Idaho, have invented certain new and useful Improvements in Wheel Pullers, of which the following is a specification.

The present invention relates to an improved wheel puller or appliance designed especially for use in removing wheels, as automobile wheels, from their axles. As is well known the rear wheels of automobiles are so closely engaged by frictional contact with their axles that difficulty is encountered in removal of the wheels when required, and great power is required for this purpose. The primary object of the present invention is the provision of a device of this character and adapted especially for this purpose, which is strong and durable, may be operated with facility, and is efficient in performing its required functions of pulling the wheel from its axle. In addition, because of its simplicity of construction and minimum number of parts, the device may be conveniently manufactured, and at comparatively slight expense.

The invention herein involved consists in certain novel combinations and arrangements of parts, as will hereinafter more fully be described and claimed. In the accompanying drawings I have illustrated one complete example of the physical embodiment of my invention, wherein the parts are combined and arranged according to the best mode I have thus far devised for the practical application of the principles of my invention.

Figure 1 is a perspective view of the device.

Figure 2 is a view showing the device in operative position and applied for the purpose of pulling the wheel from its axle.

Figure 3 is a detail, enlarged, perspective view of one of the threaded plates used in combination with the pulling jaws of the device.

In the preferred form of the invention as illustrated in the drawings I utilize a crossbar 1 preferably of metal and of the desired size and shape. At its ends the cross bar is equipped with a pair of angularly disposed arms 2 and 3, which arms are fitted into recesses or notches 2′ at the ends of the cross bar, and pivoted or hinged therein on the pins 4. The arms are thus permitted to have a pivotal movement with relation to the cross bar and may be drawn together or spread apart, within limits, as required.

At the free end of each arm is carried a jaw 5, which is fashioned, preferably, as a curved or concavo-convex metal plate conforming to the periphery of the hub H of the wheel W in Figure 2. At the outer surface of these jaws they are provided with perforated ears 6, and by means of the pins 7 passing through the ears and through complementary openings near the ends of the arms, the jaws are pivoted on the arms. The ears 6 which fit over the arms near their ends prevent lateral movement or wabbling of the jaws on the arms, while permitting a limited movement in the longitudinal plane of the arms of the jaws on the arms, for adjustment of the jaws on the hub H, and to compensate for movement of the arms on their pivots 4.

The concave faces of the jaws, as seen in Figure 1 are fashioned with tapered grooves 8 having undercut or dovetail side walls, and these grooves are adapted to receive, each, a detachable slide plate 9, curved to conform to the shape of the jaws, and tapered with beveled side edges to conform to and tightly fit in the grooves 8 of the jaws. As a protection for the threads on the exterior of the hub H, these slide plates on the jaws are fashioned with short threads 10 complementary to the hub threads. The threaded plates are provided in pairs, and the pairs of plates forming a set have threads of various sizes or pitch. Thus these interchangeable plates in pairs may be utilized in connection with the jaws, the plates being of the same size and shape, but the threads on the plates varying to adapt the device for use with various wheel hubs.

For adjusting and limiting the space between the jaws and thus adapting the device for use with hubs of varying diameters I utilize a yoke 11, which is made of a single piece of metal, bent to rectangular shape to enclose one of the arms as 2, and having a restricted end 11ª fitted over the arm 3. This restricted end of the yoke is perforated for the accommodation of a pivot pin 12 passed therethrough and through an opening in the arm 3 to permit the yoke to swing to different adjustments over the arms which it embraces. And by means of the set bolt 13 which is threaded in an opening or bolt hole 14 in the end 14′ of the yoke, it will be apparent that the arm 2 may be moved toward the arm 3. Thus when the two jaws are applied to a wheel hub, as in Figure 2, the yoke is in position with its free end 14' swung toward the cross bar 1. The two jaws are brought together on opposite sides of the hub with the threaded plates engaging the screw threads on the hub. If the screw bolt or set bolt 13 is in proper position, the yoke is slid or turned as to its free end, toward the jaw on arm 2. The end of the set bolt rides down the top edge of the arm 2 and the two jaws are thus brought into close contact with the hub. If the set bolt is not in proper position to permit this clamping action of the jaws, the bolt is turned to force the jaw of arm 2 toward the jaw of arm 3, thus clamping the parts on the hub.

After the jaws have been clamped on the hub to form an anchorage or support the operating parts of the device, a screw bar 15 is brought into play for withdrawing the wheel. This bar, which is provided with a squared end 16 to receive a tool, as a wrench, is threaded in the opening 17 at the enlarged central portion or nut portion 18 of the cross bar, and is designed to bear against the end of the wheel axle, as indicated in Figure 2. Thus with the device clamped on the wheel hub, the screw bar 16 is turned in its bearing head 18 until the inner end of the screw bar engages against the end of the wheel axle. Further turning movement of the screw bar, which remains stationary as to longitudinal movement, causes the head 18 of the bar to act as a traveling nut. The action of the traveling nut pulls on the arms which are affixed to the wheel hub, and consequently the wheel, through its hub is withdrawn from its axle. Power is thus applied with comparatively slight labor, but the force required is expended to quickly and conveniently withdraw the wheel from its axle. After withdrawal of the wheel, a slight tap of a tool against the end 14' of the yoke will cause the yoke to swing on its pivot 12, and the jaw 5 and arm 2 may then be disengaged from the hub, thus freeing the device from the wheel hub.

Having thus fully described the invention, what I claim as new and desire to secure by Letters Patent is—

1. The combination with a cross bar, of a pair of pivoted arms, a yoke pivoted on one arm and embracing the other arm, a set bolt in the end of the yoke adapted to engage the free arm, pivoted jaws on the free ends of the arms, threaded plates detachably fixed in said jaws, and a screw bar having a bearing in said cross bar.

2. The combination with a cross bar having a threaded head and a screw bar having a bearing in said head, of a pair of arms pivoted at the ends of said cross bar, a yoke pivoted on one arm and having a set bolt to engage the other arm, concavo-convex jaws having perforated ears pivoted at the ends of said arms, and detachable plates carried by said jaws for the puprose described.

3. The combination with a cross bar having a central threaded head and a screw bar therein, of jaws pivoted at the ends of said cross bar, a rectangular shaped yoke embracing said arms, said yoke having a restricted end and a pivotal connection between said end and one of said arms, a set bolt in the other end of said yoke adapted to engage the other arm, and pivoted clamping jaws on the free ends of said arms.

In testimony whereof I affix my signature.

PERCY G. NEILL.